May 5, 1925.  1,536,967
F. PALAO
EXTRICATING DEVICE
Filed Nov. 3, 1924
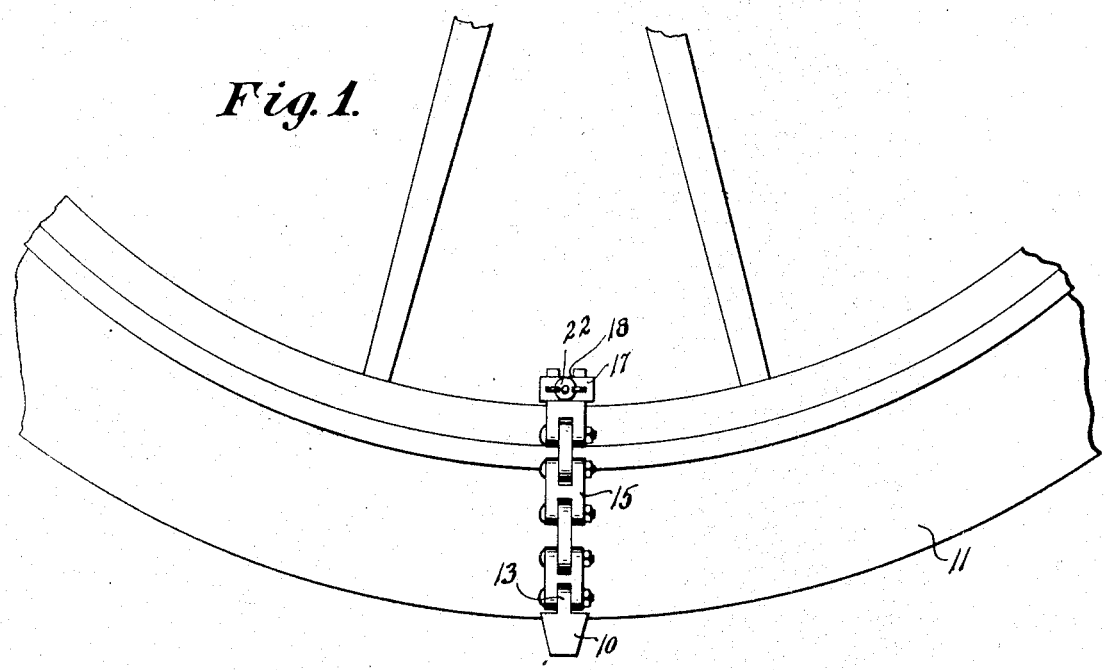
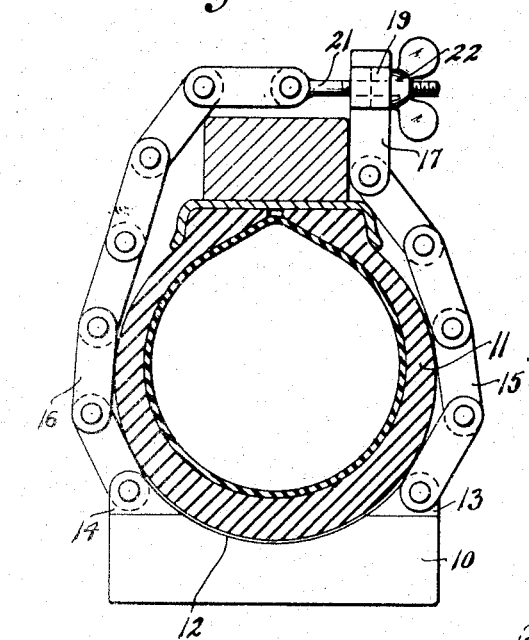
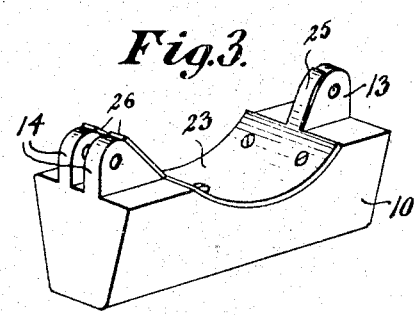
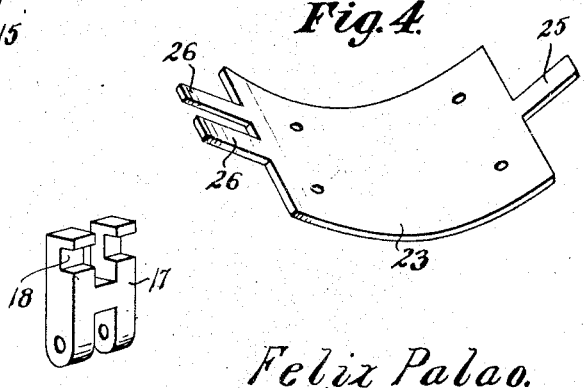
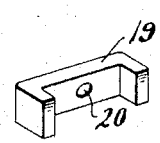
Felix Palao.
INVENTOR
BY Victor J. Evans.
ATTORNEY Patented May 5, 1925.

1,536,967

UNITED STATES PATENT OFFICE.

FELIX PALAO, OF NEW ORLEANS, LOUISIANA.

EXTRICATING DEVICE.

Application filed November 3, 1924. Serial No. 747,594.

*To all whom it may concern:*

Be it known that I, FELIX PALAO, a citizen of the United States, residing at New Orleans, in the parish of Orleans and State of Louisiana, have invented new and useful Improvements in Extricating Devices, of which the following is a specification.

This invention contemplates the provision of an automobile extricating device in the nature of a wheel attachment including a block adapted to be arranged across the tread of the tire, and associated with means to permit the block to be readily and easily attached to the wheel or removed therefrom as the occasion may require.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a fragmentary view of a wheel showing the application of the invention.

Figure 2 is a sectional view taken through the wheel showing the invention attached thereto.

Figure 3 is a perspective view of the block and the protecting element for the tire.

Figure 4 is a perspective view of the protecting element.

Figure 5 is a detail view of a part of the fastening device.

Figure 6 is a view of the other cooperating part thereof.

The device forming the subject matter of the present invention comprises a block 10 which may be constructed from any suitable material and preferably of the cross sectional configuration illustrated in Figure 3, the block being adapted to be arranged transversely across the tread of the tire 11. One side of the blocks is concaved as at 12 to conform to the curvature of said tread. Projecting from one side of the block is an apertured lug 13 which is arranged adjacent the end of the block, while projecting from the same side adjacent the other end of the block are spaced parallel lugs 14. A chain 15 is pivoted on the lug 13, while a chain 16 is pivoted between the lugs 14. these chains being arranged to embrace the tire and felly of the wheel, and have their adjacent ends connected together by means of a fastening device of novel construction. This device includes a link of construction shown in Figure 5, wherein it will be noted that the link is substantially H-shaped and indicated at 17, the spaced sides of this link are formed with aligned grooves 18 of a size to snugly receive the cross piece 19 of a substantially U-shaped member illustrated in Figure 6. The link 17 is pivoted on the end of the chain 15, while the U-shaped member shown in Figure 6 is formed with an opening 20 to receive the threaded shank 21 pivoted on the end of a chain 16. When it is desired to fasten the adjacent ends of said chains together, the U-shaped member is arranged with its body portion within the groove 18, while its parallel portions straddle the link as shown in Figure 2. The threaded shank is passed through the opening 20 and a wing nut 22 subsequently tightened on said shank until the chains 15 and 16 are drawn tightly about the tire and wheel to hold the block fixed relatively thereon. Before the block 10 is placed on the tire 11, the protecting element 23 is arranged upon the concaved surface of the block, this element 23 being constructed of leather, rubber or other suitable material to protect the thread of the tire from the detrimental effects incident to the use of the block 10. The element 23 is curved as shown in Figure 4, to conform to the concavity of the block and is provided with a single tongue 25 projecting from one end to cover the lug 13, and spaced tongues 26 projecting from the other end to cover the spaced lugs 14 of the block, when the protecting element is associated therewith. The device is very simple in construction and can be quickly and easily attached to or removed from the wheel when desired, and when positioned thereon allows the vehicle to extricate itself from mud holes and the like under its own motive power.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

An automobile extricating device comprising a block adapted to be arranged transversely of the tire, chains pivoted on said block adjacent the ends thereof and adapted to embrace the tire and felly of the vehicle, a substantially H-shaped link pivoted on the free end of one of the said chains, and having aligned grooves, a substantially U-shaped element adapted to embrace said link and having its transverse portion received by said grooves, said portion having a central opening, a threaded shank carried by the free end of the other chain and adapted to pass through said opening, and a nut adapted to be threaded on said element for holding certain parts associated.

In testimony whereof I affix my signature.

FELIX PALAO.